(12) United States Patent
Ebner et al.

(10) Patent No.: US 10,106,082 B2
(45) Date of Patent: Oct. 23, 2018

(54) SYSTEM AND METHOD FOR WARNING OF AN IMMINENT COLLISION BETWEEN A TOWING VEHICLE AND ITS TRAILER WHEN REVERSING

(71) Applicant: Continental Automotive GmbH, Hannover (DE)

(72) Inventors: Christian Ebner, Deggendorf (DE); Holger Haslsteiner, Mintraching (DE); Martin Lechner, Neustadt (DE); Christian Rappl, Bad Abbach (DE); Karlheinz Reichl, Thalmassing (DE); Thomas Stoll, Thalmassing (DE); Christoph Hammer, Duggendorf (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/514,708

(22) PCT Filed: Sep. 7, 2015

(86) PCT No.: PCT/DE2015/200452
§ 371 (c)(1),
(2) Date: Mar. 27, 2017

(87) PCT Pub. No.: WO2016/055059
PCT Pub. Date: Apr. 14, 2016

(65) Prior Publication Data
US 2017/0232893 A1  Aug. 17, 2017

(30) Foreign Application Priority Data
Oct. 7, 2014  (DE) .................. 10 2014 220 269

(51) Int. Cl.
*B60Q 9/00* (2006.01)
*B62D 13/06* (2006.01)
(Continued)

(52) U.S. Cl.
CPC ............. *B60Q 9/008* (2013.01); *B60D 1/245* (2013.01); *B60D 1/305* (2013.01); *B60D 1/62* (2013.01);
(Continued)

(58) Field of Classification Search
CPC ...... B60Q 9/002; B60Q 9/008; B60R 1/1207; B62D 13/06; G08G 1/16
See application file for complete search history.

(56) References Cited

U.S. PATENT DOCUMENTS 6,178,650 B1   1/2001  Thibodeaux
8,044,776 B2 * 10/2011  Schofield ................ B60C 23/00
                                                340/425.5
(Continued)

FOREIGN PATENT DOCUMENTS

DE      199 36 578       3/2001
DE      100 65 230       7/2002
(Continued)

OTHER PUBLICATIONS

International Search Report of the International Searching Authority for International Application PCT/DE2015/200452, dated Feb. 18, 2016, 3 pages, European Patent Office, HV Rijswijk, Netherlands.
(Continued)

*Primary Examiner* — Sisay Yacob
(74) *Attorney, Agent, or Firm* — W. F. Fasse (57) ABSTRACT

A system for warning of an imminent collision between a towing vehicle (2) and a trailer (3) when reversing includes an arrangement for providing a warning signal to a driver of the vehicle dependent on an angle between a longitudinal axis of the towing vehicle (2) and a longitudinal axis of the trailer (3), when there is the threat of a collision between the towing vehicle (2) and the trailer (3) while reversing.

18 Claims, 4 Drawing Sheets

(51) Int. Cl.
  B60R 1/12 (2006.01)
  G08G 1/16 (2006.01)
  B60T 7/20 (2006.01)
  B60R 1/02 (2006.01)
  B60D 1/24 (2006.01)
  B60D 1/30 (2006.01)
  B60D 1/62 (2006.01)

(52) U.S. Cl.
  CPC .............. *B60Q 9/002* (2013.01); *B60R 1/025* (2013.01); *B60R 1/1207* (2013.01); *B60T 7/20* (2013.01); *B62D 13/06* (2013.01); *G08G 1/16* (2013.01); *B60T 2201/022* (2013.01); *H05K 999/99* (2013.01)

(56) References Cited

U.S. PATENT DOCUMENTS

| | | |
|---|---|---|
| 2008/0231701 A1 | 9/2008 | Greenwood et al. |
| 2009/0091436 A1 | 4/2009 | Anderson |
| 2012/0200706 A1* | 8/2012 | Greenwood .............. B60R 1/00 348/148 |
| 2012/0229639 A1 | 9/2012 | Singleton |
| 2013/0076007 A1 | 3/2013 | Goode et al. |
| 2014/0303847 A1* | 10/2014 | Lavoie .................. B62D 13/06 701/41 |
| 2015/0066349 A1 | 3/2015 | Chan et al. |
| 2016/0001705 A1* | 1/2016 | Greenwood .............. B60R 1/00 348/148 |
| 2016/0167583 A1 | 6/2016 | Schrepfer |

FOREIGN PATENT DOCUMENTS

| | | |
|---|---|---|
| DE | 101 54 612 | 5/2003 |
| DE | 103 05 761 | 9/2004 |
| DE | 102004025252 | 12/2005 |
| DE | 102005045195 | 4/2006 |
| DE | 102005027846 | 12/2006 |
| DE | 102006037600 | 2/2008 |
| DE | 102008030104 | 2/2009 |
| DE | 102006037600 B4 | 3/2010 |
| DE | 102008045436 | 3/2010 |
| DE | 102010026222 | 5/2011 |
| DE | 102011113197 | 3/2013 |
| DE | 102012006206 | 10/2013 |
| GB | 2 447 672 | 9/2008 |
| WO | WO 88/04619 | 6/1988 |

OTHER PUBLICATIONS

PCT International Preliminary Report on Patentability including English Translation of PCT Written Opinion of the International Searching Authority for International Application PCT/DE2015/200452, dated Apr. 11, 2017, 6 pages, International Bureau of WIPO, Geneva, Switzerland.

German Search Report for German Patent Application No. 10 2014 220 269.8, dated May 15, 2015, 8 pages, Muenchen, Germany, with English translation, 6 pages.

* cited by examiner

SYSTEM AND METHOD FOR WARNING OF AN IMMINENT COLLISION BETWEEN A TOWING VEHICLE AND ITS TRAILER WHEN REVERSING

System and method for warning of an imminent collision between a towing vehicle and trailer when reversing a towing vehicle with trailer.

FIELD OF THE INVENTION

The invention relates to a system and a method for warning against an imminent collision between a towing vehicle and a trailer when reversing a towing vehicle with a trailer, which are designed to issue a warning signal if there is the threat of a collision between the towing vehicle and the trailer.

BACKGROUND INFORMATION

Reversing with a trailer, which is for example moved by a towing vehicle via a tow coupling, usually requires some practice, since the trailer tends to veer out or to buckle, which can lead to damage to the rear of the towing vehicle. One problem here is, for example, that the turning in of the trailer when there is a change to the steering angle of the towing vehicle is not easy to foresee.

This problem is further exacerbated by the fact that due to the increasing traffic density, the existing traffic routes and parking spaces are being increasingly intensively used, in particular in urban centers, so that a maneuvering or backing up space available when reversing a towing vehicle with a trailer is becoming increasingly smaller.

Additionally, this problem is further aggravated in darkness or generally poor visibility conditions, due to the then insufficiently observable trailer.

A system and a method are known from document DE 100 65 230 A1 for facilitating maneuvering and/or reversing of a towing vehicle with a trailer, wherein the towing vehicle features a steering angle measuring facility that captures the steering angle of the steerable axis of the towing vehicle, and at least one environment facility which captures the proximate environment area of the towing vehicle that faces the trailer, in particular a parking aid facility. Here, an evaluation unit is further provided which evaluates the captured values, and which gives instructions regarding the turning of a steering wheel of the towing vehicle.

SUMMARY OF THE INVENTION

An object of at least two embodiments of the present invention is to provide a system and a method, respectively, for warning of an imminent collision between a towing vehicle and its trailer when reversing the towing vehicle with its trailer, which are simply designed and with which a driver of the motor vehicle can be reliably warned of an imminent collision between the towing vehicle and the trailer when reversing.

According to one embodiment of the invention, this object is attained by means of a system for warning of an imminent collision between a towing vehicle and a trailer when reversing a towing vehicle with a trailer, which features a monitoring facility for continuously monitoring an angle between a longitudinal axis of the towing vehicle and a longitudinal axis of the trailer when reversing the towing vehicle, in order to detect whether there is the threat of a collision between the towing vehicle and the trailer, and to generate a warning signal if there is the threat of a collision between the towing vehicle and the trailer.

The basic principle is thus to provide a monitoring facility which when reversing a towing vehicle with a trailer monitors an angle between a longitudinal axis of the towing vehicle and a longitudinal axis of the trailer, and which is also designed to generate a warning signal if when monitoring the angle between the longitudinal axis of the towing vehicle and the longitudinal axis of the trailer the threat of a collision between the towing vehicle and the trailer is detected.

Such a system has the advantage that with this, a system for warning of an imminent collision between the towing vehicle and the trailer when reversing a towing vehicle with a trailer is presented, which is simply designed and with which a driver of the towing vehicle can be reliably warned of an imminent collision between the towing vehicle and the trailer when reversing a towing vehicle with a trailer. Thus, due to the fact that the system features a monitoring facility which is designed when reversing to continuously capture an angle between the longitudinal axis of the towing vehicle and the longitudinal axis of the trailer and to generate a warning signal if in the process the threat of a collision between the towing vehicle and the trailer is detected, a driver of the towing vehicle can be warned in due time of the threat of collision, so that they can initiate corresponding actions that prevent the collision, in particular, initiate corresponding driving manoeuvers. Compared with systems for facilitating the reversing of a towing vehicle with a trailer in which when there is an imminent collision between the towing vehicle and the trailer, instructions for the necessary turning of the steering wheel of the towing vehicle are issued, the system has the further advantage that in order to generate the warning signal, no further sensors, in particular no steering angle sensors, are required to capture a current turning of the steering wheel of the towing vehicle and further, no evaluation units are required for the further processing of the data captured by the steering angle sensor, and as a result, no costly and extensive refurbishment of the towing vehicle and/or the trailer are required. Additionally, such a system can be simply retrofitted without great effort into standard motor vehicles and/or trailers.

According to one embodiment, the monitoring facility here comprises at least two environment sensors arranged on the rear of the towing vehicle and/or on a front side of the trailer facing the towing vehicle, for continuously capturing distance values between the towing vehicle and the trailer, an evaluation unit for determining the angle between the longitudinal axis of the towing vehicle and the longitudinal axis of the trailer, based on the distance values captured by the environment sensors, a comparator for comparing the determined angle with a limit value for the angle, in order to detect whether there is the threat of a collision between the towing vehicle and the trailer, and a warning signal emitter for issuing a warning signal if there is the threat of a collision between the towing vehicle and the trailer. Here, it can be determined via the environment sensor and the evaluation unit whether the front side of the trailer facing the towing vehicle has an even distance to the towing vehicle, for example at certain measurement points, or whether a section of the trailer has a lesser distance to the towing vehicle than another section of the trailer, for example. If it is here determined that the trailer has an even distance to the towing vehicle, the longitudinal axis of the trailer continues in the longitudinal axis of the towing vehicle, so that between these longitudinal axes, there is an angle of 0°. However, if it is determined that the trailer has an uneven distance to the towing vehicle, there is an angle between the longitudinal axes of the trailer and the towing vehicle that does not equal 0°. If this angle here exceeds a limit value which signals that the trailer threatens to veer out, a corresponding message about this can be issued to the driver via a warning signal emitter, so that the driver can react accordingly, i.e. initiate safety-oriented actions to prevent a collision, in particular corresponding driving manoeuvers. The environment sensors can here be part of a parking assistance facility of the towing vehicle and can in particular be designed to capture the distance values between the towing vehicle and the trailer as soon as a reverse gear has been engaged.

The warning signal emitter can here feature an acoustic warning signal emitter. Acoustic signalers are known among standard motor vehicles, in order to raise awareness among traffic participants of the critical nature of a corresponding situation by generating an acoustic signal, through which they can be motivated to de-escalate the critical situation accordingly. The acoustic warning signal is here preferably a tone or a series of tones, which is designed to issue a discreet message to the driver that there is the threat of a collision between the towing vehicle and the trailer, without this message being perceived by the driver and/or their environment as uncomfortable or restricting. Due to the unrestricted warning function, the comfort sensation can be increased in an advantageous manner, in particular in situations in which the driver wishes or is required to avoid noticeable acoustic messages.

Further, the warning signal emitter can also feature an optical warning signal emitter. Optical warning signals have the advantage that they are also perceived when there is a loud noise background, for example due to traffic noise, and can provide the driver with a warning regarding the threat of a collision between the towing vehicle and the trailer.

Further, the warning signal emitter can however also be designed to generate further warning signals, for example haptic warning signals. It is further feasible that as a result of the detection of an imminent collision between the towing vehicle and the trailer, the warning signal emitter automatically intervenes in the control system of the towing vehicle, i.e. corresponding driving manoeuvers are initiated, such as the vehicle being automatically stopped.

The warning signal emitter can here be arranged on the trailer. This has the advantage that no additional components and/or function on the towing vehicle itself are required, or must be integrated into it. Here, the warning signal emitter can for example be a battery-operated warning signal emitter, which can be temporarily mounted to the trailer and thus mounted whenever needed. Further, the warning signal emitter can however also be a battery-operated warning signal emitter or a stationary one that is connected via the trailer coupling to the electronics of the towing vehicle, and thus permanently attached to the trailer.

Further, the warning signal emitter can however also be integrated into the motor vehicle. Thus, warning signal emitters are known that are integrated in a standard motor vehicle, which can be simply retrofitted and without great effort for the function of warning of an imminent collision between the towing vehicle and the trailer, without extensive and costly retrofitting work or further components being required. The function of the warning signal emitter can here be operated via a speech-controlled on-board computer. Further, the function of the warning signal emitter can also be realized through an optical warning message issued via lamps, which are e.g. arranged on the dashboard of the towing vehicle and/or a display unit of the motor vehicle, for example a display unit of an infotainment system of the motor vehicle. Here, a current distance between the towing vehicle and the trailer or the towing vehicle together with the trailer from the bird's-eye perspective can also be shown on the display unit.

According to a further embodiment, the monitoring facility can additionally or alternatively also feature at least two reflectors arranged on the front side of the trailer facing the towing vehicle, wherein the at least two reflectors are arranged on the trailer such that when there is an imminent collision between the towing vehicle and the trailer, they reflect light emitted from at least one signal source of the towing vehicle into at least one interior and/or exterior mirror of the towing vehicle. Since the angle under which the light is reflected by the reflectors is here dependent on the current angle between the longitudinal axis of the towing vehicle and the longitudinal axis of the trailer, the reflectors can in particular be arranged such on the front side of the trailer that the light is reflected in an exterior mirror of the motor vehicle as soon as there is the threat of a collision between the towing vehicle and the trailer. Via the light reflected in the exterior mirror, it is thus signaled to the driver of the motor vehicle that there is the threat of a collision between the towing vehicle and the trailer, and the driver is thus warned of an imminent collision, so that they can initiate corresponding safety-oriented actions that prevent the collision, in particular corresponding driving manoeuvers. This can also be simply realized at a low cost by the reflectors attached to the trailer, without high-cost, extensive retrofitting of the towing vehicle and/or the trailer being required. Further, a standard trailer can be simply retrofitted with such reflectors, and without extensive work required.

The at least one signal source of the towing vehicle can here be a reverse drive light of the towing vehicle. Thus, standard motor vehicles have such reverse drive lights, so that the function of the at least one signal source can be realized by components that are known and usable for standard motor vehicles, without extensive, costly conversion being required.

According to a further embodiment, the monitoring facility can, alternatively or additionally, also feature a signal lamp arranged on the front side of the trailer facing the towing vehicle, wherein the signal lamp is arranged on the trailer such that warning light signals emitted from the signal lamp hit an exterior mirror of the towing vehicle and can be perceived in this as soon as there is the threat of a collision between the towing vehicle and the trailer. The signal lamp can here be designed to emit light in a certain angle range, wherein the signal lamp is attached to the trailer in such a manner that the warning light signals emitted by the signal lamp can be perceived in an exterior mirror of the towing vehicle as soon as there is the threat of a collision between the towing vehicle and the trailer. As a result, the driver of the towing vehicle can in turn be warned of the threat of a collision and initiate corresponding safety-oriented actions to avoid the collision, in particular corresponding driving manoeuvers. Additionally, the signal lamp can here feature an illuminant that is designed to emit light in different colors under different angle areas, so that the light emitted from the light source has light areas of different colors, wherein the signal lamp is arranged in such a manner on the trailer that if there is no threat of a collision between the towing vehicle and the trailer, then light from a first light area, for example a green light area, and on the other hand, if there is the threat of a collision between the towing vehicle and the trailer, then light from a second light area, such as a red light area, hits the exterior mirror and can be perceived in said mirror.

Further, standard trailers can be simply retrofitted without great effort with such a signal lamp, without costly and extensive conversion of the trailer being necessary. The switching on or supplying of the signal lamp with electric energy can here further be controlled via the reverse light on the trailer plug socket, for example. This has the advantage that the signal lamp is only switched on or supplied with electrical energy when the towing vehicle also really does reverse drive, so that the driver and/or other traffic participants are not impaired in normal driving mode by light emitted from the signal lamp, as a result of which comfort can be further increased.

With a further embodiment of the invention, a method for warning against an imminent collision between the towing vehicle and the trailer when a towing vehicle with a trailer is reversing is provided. Here, the method features the following steps: thus when reversing the towing vehicle, an angle between a longitudinal axis of the towing vehicle and a longitudinal axis of the trailer is continuously monitored, and it is detected whether there is the threat of a collision between the towing vehicle and the trailer. If it is here detected that there is the threat of a collision between the towing vehicle and trailer, a warning signal is further generated.

Such a method has the advantage that with this, a method for warning of an imminent collision between the towing vehicle and the trailer when reversing a towing vehicle with a trailer is provided, which is simply designed and with which a driver of the motor vehicle can be reliably warned of an imminent collision between the towing vehicle and the trailer when reversing a towing vehicle with a trailer. Thus, due to the fact that when reversing, an angle between the longitudinal axis of the towing vehicle and the longitudinal axis of the trailer is continuously captured, and a warning signal is generated if it is detected in the process that there is the threat of a collision between the towing vehicle and the trailer, the driver of the towing vehicle can be warned in due time of the imminent collision, so that they can initiate corresponding actions that prevent the collision, in particular, initiate corresponding driving manoeuvers. Compared to methods for facilitating reversing of a towing vehicle with a trailer, in which when there is the threat of a collision between the towing vehicle and the trailer, instructions for the necessary turning of the steering wheel of the towing vehicle are issued, the method further has the advantage that no data is required from further sensors and is incorporated into the method, in particular no data of a steering angle sensor for capturing a current turning of a steering wheel of the towing vehicle, and as a result, no costly and extensive conversion of the towing vehicle and/or the trailer are required in order to realize or implement the method. Additionally, such a system for implementing such a method can be simply retrofitted without great effort into standard motor vehicles and/or trailers.

According to one embodiment, the steps of continuous monitoring of an angle between a longitudinal axis of the towing vehicle and a longitudinal axis of the trailer when reversing the towing vehicle, and of detecting whether there is the threat of a collision between the towing vehicle and the trailer here feature the following steps: thus at least two distance values between the towing vehicle and the trailer are continuously captured by means of at least two environment sensors arranged on the rear of the towing vehicle and/or on a front side of the trailer facing the towing vehicle, and on the basis of the captured distance values, the angle between the longitudinal axis of the towing vehicle and the longitudinal axis of the trailer is determined. The determined angle is further compared with a limit value for the angle, in order to detect whether there is the threat of a collision between the towing vehicle and the trailer. Here, it can be determined through the capturing of the distance values and the determination of the angle between the longitudinal axis of the towing vehicle and the longitudinal axis of the trailer whether the front side of the trailer facing the towing vehicle has an even distance to the towing vehicle, for example at certain measurement points, or whether a section of the trailer has a lesser distance to the towing vehicle than another section of the trailer, for example. If it is here determined that the trailer has an even distance to the towing vehicle, the longitudinal axis of the trailer continues in the longitudinal axis of the towing vehicle, so that between these longitudinal axes, there is an angle of 0°. However, if it is determined that the trailer has an uneven distance to the towing vehicle, there is an angle between the longitudinal axes of the trailer and the towing vehicle that does not equal 0°. If it is here detected that this angle here exceeds a limit value which signalizes that the trailer threatens to veer out, a corresponding message about this can be issued to the driver by emitting a warning signal, so that the driver can react accordingly, i.e. initiate safety-oriented actions to prevent a collision, in particular corresponding driving manoeuvers.

The warning signal can here be an acoustic warning signal. Acoustic signalers for generating acoustic warning signals are known among standard motor vehicles, in order to raise awareness among traffic participants of the critical nature of a corresponding situation by generating an acoustic signal, through which they can be motivated to de-escalate the critical situation accordingly. The acoustic warning signal is here preferably a tone or a series of tones, which is designed to issue a discreet message to the driver that there is the threat of a collision between the towing vehicle and the trailer, without this message being perceived by the driver and/or their environment as uncomfortable or restricting. Due to the unrestricted warning function, the comfort sensation can be increased in an advantageous manner, in particular in situations in which the driver wishes or is required to avoid noticeable acoustic messages.

Further, the warning signal can also be an optical warning signal. Optical warning signals have the advantage that they are also perceived when there is a loud noise background, for example due to traffic noise, and can provide the driver with a warning regarding the threat of the collision between the towing vehicle and the trailer.

Further, the warning signal can however also be any other warning signal suitable for notifying a driver of the towing vehicle about the threat of the collision between the towing vehicle and the trailer, such as a haptic warning signal. It is further feasible that as a result of the detection of an imminent collision between the towing vehicle and the trailer, there is an automatic intervention in the control system of the motor vehicle, i.e. corresponding driving manoeuvers are initiated, such as the vehicle being automatically stopped.

According to a further embodiment, the steps of continuous monitoring of an angle between a longitudinal axis of the towing vehicle and a longitudinal axis of the trailer when reversing the towing vehicle and detecting whether there is the threat of a collision between the towing vehicle and trailer can additionally or as an alternative feature the following steps: thus at least two reflectors are provided on the front side of the trailer facing the towing vehicle, wherein the at least two reflectors are arranged such on the trailer that when there is an imminent collision between the towing vehicle and the trailer, they reflect light emitted from at least one signal source of the towing vehicle into at least one interior and/or exterior mirror of the towing vehicle. Here, when reversing, light signals are emitted via the at least one signal source of the towing vehicle and it is determined whether the emitted light signals are reflected in the at least one interior and/or exterior mirror, in order to detect whether there is the threat of a collision between the towing vehicle and the trailer. Since the angle under which the light is reflected by the reflectors is here dependent on the current angle between the longitudinal axis of the towing vehicle and the longitudinal axis of the trailer, the reflectors can in particular be arranged such on the front side of the trailer that the light is reflected in an exterior mirror of the motor vehicle as soon as there is the threat of a collision between the towing vehicle and the trailer. Via the light reflected in the exterior mirror, it can thus be signaled to the driver of the motor vehicle that there is the threat of a collision between the towing vehicle and the trailer, so that the driver is thus warned of an imminent collision, and can initiate corresponding safety-oriented actions that prevent the collision, in particular corresponding driving manoeuvers. The at least one signal source of the towing vehicle can here be a reverse drive light of the towing vehicle, for example. Thus, standard motor vehicles have such reverse drive lights, so that the function of the at least one signal source can be realized through components that are known and usable for standard motor vehicles, without extensive, costly conversion being required.

According to a further embodiment, the steps of continuous monitoring of an angle between a longitudinal axis of the towing vehicle and a longitudinal axis of the trailer when reversing the towing vehicle and detecting whether there is the threat of a collision between the towing vehicle and trailer can additionally or as an alternative feature the following steps: thus a signal lamp is provided on the front side of the trailer facing the towing vehicle, wherein the signal lamp is arranged such on the trailer that warning signals emitted from the signal lamp hit an exterior mirror of the towing vehicle and can be perceived in said mirror as soon as there is the threat of a collision between the towing vehicle and the trailer. Here, when reversing, light signals are emitted via the signal lamp, wherein the emitted light signals comprise at least the warning light signals. Here, it is further determined whether the emitted warning light signals hit the at least one exterior mirror of the motor vehicle and can be perceived in said vehicle, in order to detect whether there is the threat of a collision between the towing vehicle and the trailer. Due to the fact that the signal lamp, which can be designed to emit light in a certain angle range, is attached to the trailer in such a way and is thus provided that the warning light signals emitted by the signal lamp can be perceived in an exterior mirror of the towing vehicle as soon as there is the threat of a collision between the towing vehicle and the trailer, the driver of the towing vehicle can in turn be warned of the imminent collision, and initiate corresponding safety-oriented actions that prevent the collision, in particular, initiate corresponding driving manoeuvers. Additionally, the signal lamp can here for example be an illuminant that is designed to emit light in different colors under different angle areas, so that the light emitted from the light source has light area of different colors, wherein the signal lamp is arranged and provided in such a manner on the trailer that if there is no threat of a collision between the towing vehicle and the trailer, then light from a first light area, for example a green light area, and on the other hand, if there is the threat of a collision between the towing vehicle and the trailer, then light from a second light area, such as a red light area, hits the exterior mirror and can be perceived in said mirror. The switching on or supplying the signal lamp with electric energy can here further be controlled via the reverse light on the trailer plug socket, for example. This has the advantage that the signal lamp is only switched on or supplied with electrical energy when the towing vehicle also really does reverse drive, so that the driver and/or other traffic participants are not impaired in normal driving mode by light emitted from the signal lamp, as a result of which comfort can be further increased.

In summary, it can be ascertained that with the present invention, a system and a method for warning of an imminent collision between the towing vehicle and the trailer when reversing a towing vehicle with a trailer are provided which are simply designed and with which a driver of a motor vehicle can be reliably warned of an imminent collision between the towing vehicle and the trailer when reversing a towing vehicle with a trailer.

Thus, due to the fact that when reversing, an angle between the longitudinal axis of the towing vehicle and the longitudinal axis of the trailer is continuously captured, and further, a warning signal is generated if it is detected in the process that there is the threat of a collision between the towing vehicle and the trailer, the driver of the towing vehicle can be warned in due time of the imminent collision, so that they can initiate corresponding actions that prevent the collision, in particular, initiate corresponding driving manoeuvers.

Also, compared with systems and/or methods for facilitating the reversing of a towing vehicle with a trailer in which when there is an imminent collision between the towing vehicle and the trailer, instructions for the necessary turning of the steering wheel of the towing vehicle are issued, no further sensors, in particular no steering angle sensors, are required to capture a current turning of the steering wheel of the towing vehicle and further, no evaluation units are required for the further processing of the data captured by the steering angle sensor, and as a result, no costly and extensive refurbishment of the towing vehicle and/or the trailer are required. The system can also be simply retrofitted without great effort into standard motor vehicles and/or trailers.

BRIEF DESCRIPTION OF THE DRAWINGS

The invention will now be explained in greater detail with reference to the appended drawings.

DETAILED DESCRIPTION OF EXAMPLE EMBODIMENTS OF THE INVENTION

Figure 1:
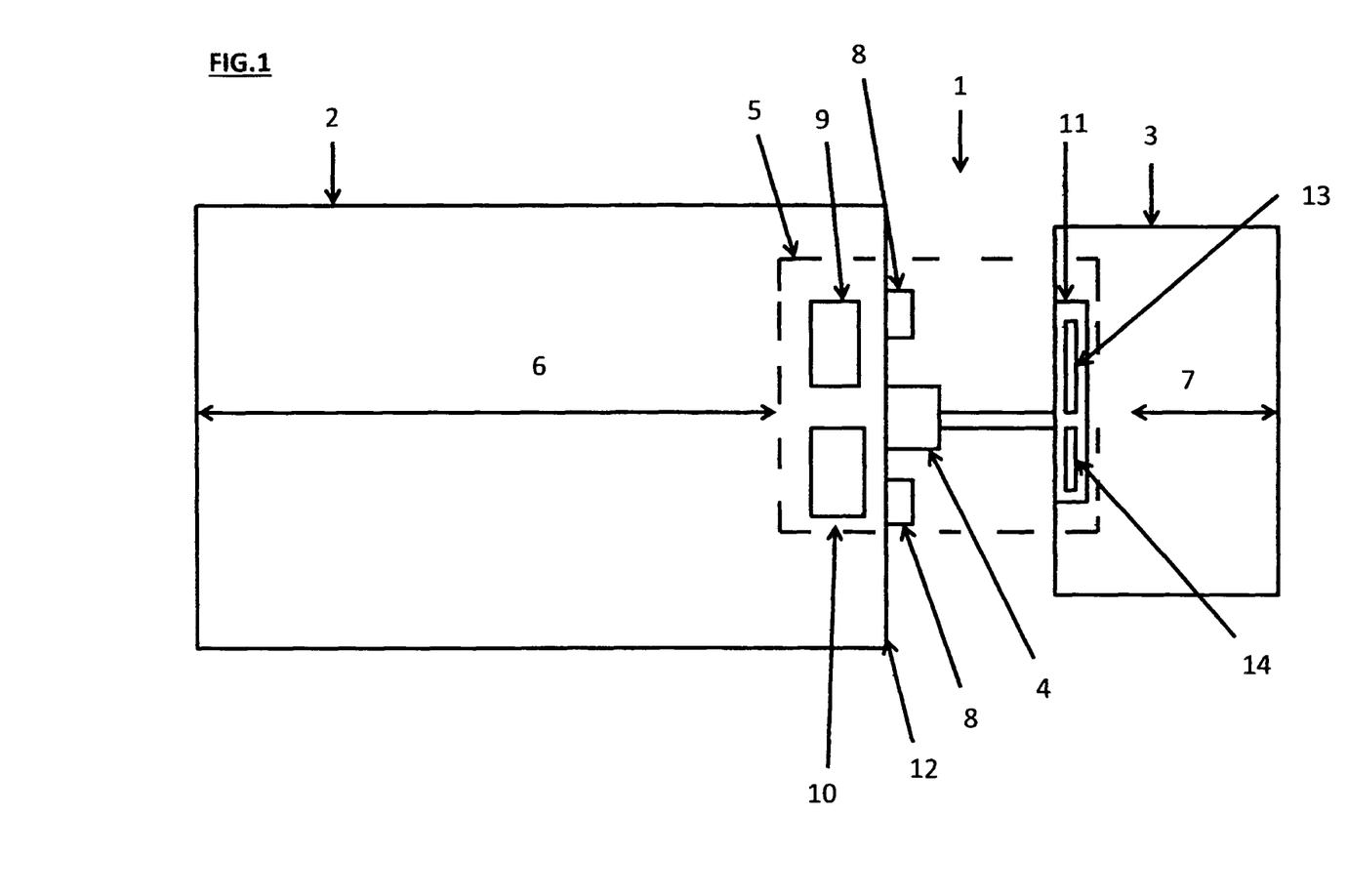
FIG. 1 shows a schematic block diagram of a system for warning of an imminent collision between the towing vehicle and the trailer when reversing a towing vehicle with a trailer according to a first embodiment of the invention.

FIG. 1 shows a schematic block diagram of a system 1 for warning of an imminent collision between the towing vehicle 2 and the trailer 3 when reversing a towing vehicle 2 with a trailer 3 according to a first embodiment of the invention.

FIG. 1 here shows a towing vehicle 2 and a trailer 3 connected to the towing vehicle 2 which is moved via a trailer coupling 4 by the towing vehicle 2.

The reversing of such a towing vehicle/trailer combination usually requires some practice, particularly since the trailer has a tendency to veer out. One problem here is, for example, that the turning in of the trailer when there is a change to the steering angle of the towing vehicle is not easy to foresee. This problem is further exacerbated by the fact that due to the increasing traffic density, the existing traffic routes and parking spaces are being increasingly intensively used, in particular in urban centers, so that a maneuvering or backing up space available when reversing a towing vehicle with a trailer is becoming increasingly smaller. Additionally, this problem is further aggravated in darkness or generally poor visibility conditions, due to the then insufficiently observable trailer.

According to the embodiment in FIG. 1, the system 1 features for this purpose a monitoring facility 5 which is designed to continuously monitor an angle between a longitudinal axis of the towing vehicle 2 and a longitudinal axis of the trailer 3 when reversing the towing vehicle 2, in order to detect whether there is the threat of a collision between the towing vehicle 2 and the trailer 3 and to issue a warning signal if it is here detected that there is the threat of a collision between the towing vehicle 2 and the trailer 3. The longitudinal axis of the towing vehicle 2 is here symbolized by the arrow assigned reference numeral 6 and the longitudinal axis of the trailer 3 is symbolized by the arrow assigned reference numeral 7.

Such a system 1 has the advantage that with this, a system 1 for warning of an imminent collision between the towing vehicle 2 and the trailer 3 when reversing a towing vehicle 2 with a trailer 3 is provided, which is simply designed and with which a driver of the motor vehicle can be reliably warned of an imminent collision between the towing vehicle 2 and the trailer 3 when reversing a towing vehicle 2 with a trailer 3. Thus, by means of the monitoring facility 5, a driver of the towing vehicle 2 can be warned in due time of the imminent collision, so that they can initiate corresponding safety-oriented actions to avoid the collision, in particular corresponding driving manoeuvers. Compared with systems for facilitating the reversing of a towing vehicle 2 with a trailer 3 in which when there is an imminent collision between the towing vehicle 2 and the trailer 3, instructions for the necessary turning of the steering wheel of the towing vehicle 2 are issued, the system 1 has the advantage that no further sensors, in particular no steering angle sensors, are required to capture a current turning of the steering wheel of the towing vehicle 2 and as a result, no costly and extensive refurbishment of the towing vehicle 2 and/or the trailer 3 are required. Additionally, such a system 1 can be simply retrofitted without great effort into standard motor vehicles and/or trailers 3.

According to one embodiment of FIG. 1, the monitoring facility 5 here features two environment sensors 8 for continuously capturing distance values between the towing vehicle 2 and the trailer 3, an evaluation unit 9 for determining the angle between the longitudinal axis of the towing vehicle 2 and the longitudinal axis of the trailer 3, based on the distance values captured by the environment sensors 8, a comparator 10 for comparing the determined angle with a limit value for the angle, in order to detect whether there is the threat of a collision between the towing vehicle 2 and the trailer 3, and a warning signal emitter 11 for issuing a warning signal if there is the threat of a collision between the towing vehicle 2 and the trailer 3. The limit value for the angle is here an angle value which signalizes that the trailer threatens to veer out.

According to the embodiment in FIG. 1, the at least two environment sensors 8 are here arranged on the rear 12 of the towing vehicle 2. Further, however, at least one of the environment sensors can also be arranged on the front side of the trailer facing the towing vehicle.

The warning signal emitter 11 in FIG. 1 here comprises an optical warning signal emitter 13.

The warning signal emitter 11 in FIG. 1 can also comprise an acoustic warning signal emitter 14.

Further, the warning signal emitter can however also be designed to generate further warning signals, for example haptic warning signals. It is further feasible that as a result of the detection of an imminent collision between the towing vehicle and the trailer, the warning signal emitter automatically intervenes in the control system of the towing vehicle, i.e. corresponding driving manoeuvers are initiated, such as the vehicle being automatically stopped.

According to the embodiment in FIG. 1, the warning signal emitter 11 is also arranged on the trailer 3. Here, the warning signal emitter can for example be a battery-operated warning signal emitter, which can be temporarily mounted to the trailer and thus mounted whenever needed. Additionally, the warning signal emitter can however also be a battery-operated warning signal emitter or a stationary one that is connected via the trailer coupling to the electronics of the towing vehicle, and thus permanently attached to the trailer. Further, the warning signal emitter can however also be integrated into the motor vehicle.

Figure 2:
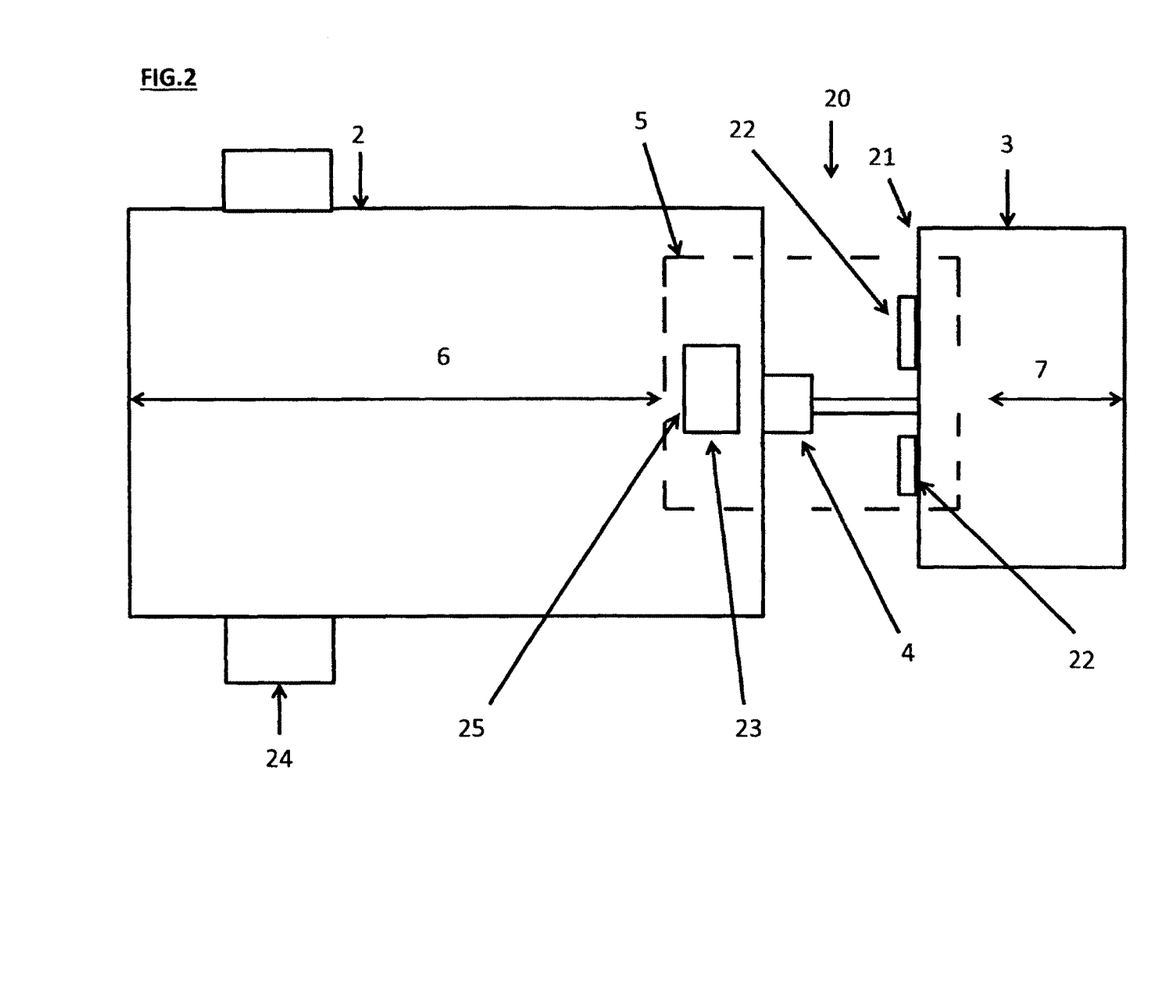
FIG. 2 shows a schematic block diagram of a system for warning of an imminent collision between the towing vehicle and the trailer when reversing a towing vehicle with a trailer according to a second embodiment of the invention.

FIG. 2 shows a schematic block diagram of a system 20 for warning of an imminent collision between the towing vehicle 2 and the trailer 3 when reversing a towing vehicle 2 with a trailer 3 according to a second embodiment of the invention. Components and structural parts with the same construction or function as in FIG. 1 have here been assigned the same reference numerals, and are not explained separately.

According to the embodiment in FIG. 2, the monitoring facility 5 here comprises at least two reflectors 22 arranged on the front side 21 of the trailer 3 facing the towing vehicle 2. The at least two reflectors 22 are here arranged on the trailer 3 in such a manner that with an imminent collision between the towing vehicle 2 and the trailer 3 they reflect light emitted from at least one signal source 23 of the towing vehicle 2 into at least one interior and/or exterior mirror 24 of the towing vehicle 2. According to the embodiment in FIG. 2, the reflectors 22 are here arranged on the front side 21 of the trailer 3 in such a manner that the light emitted by the at least one signal source 23 of the towing vehicle 2 is reflected in an exterior mirror 24 of the towing vehicle 2 as soon as there is the threat of a collision between the towing vehicle 2 and the trailer 3. Via the light reflected in the exterior mirror 24, it is thus signaled to the driver of the towing vehicle 2 that there is the threat of a collision between the towing vehicle 2 and the trailer 3, and the driver is thus warned of an imminent collision, so that they can initiate corresponding safety-oriented actions that prevent the collision, in particular corresponding driving manoeuvers.

According to the embodiment in FIG. 2, the at least one signal source 23 of the towing vehicle 2 is here a reversing lamp 25 of the towing vehicle 2.

Figure 3:
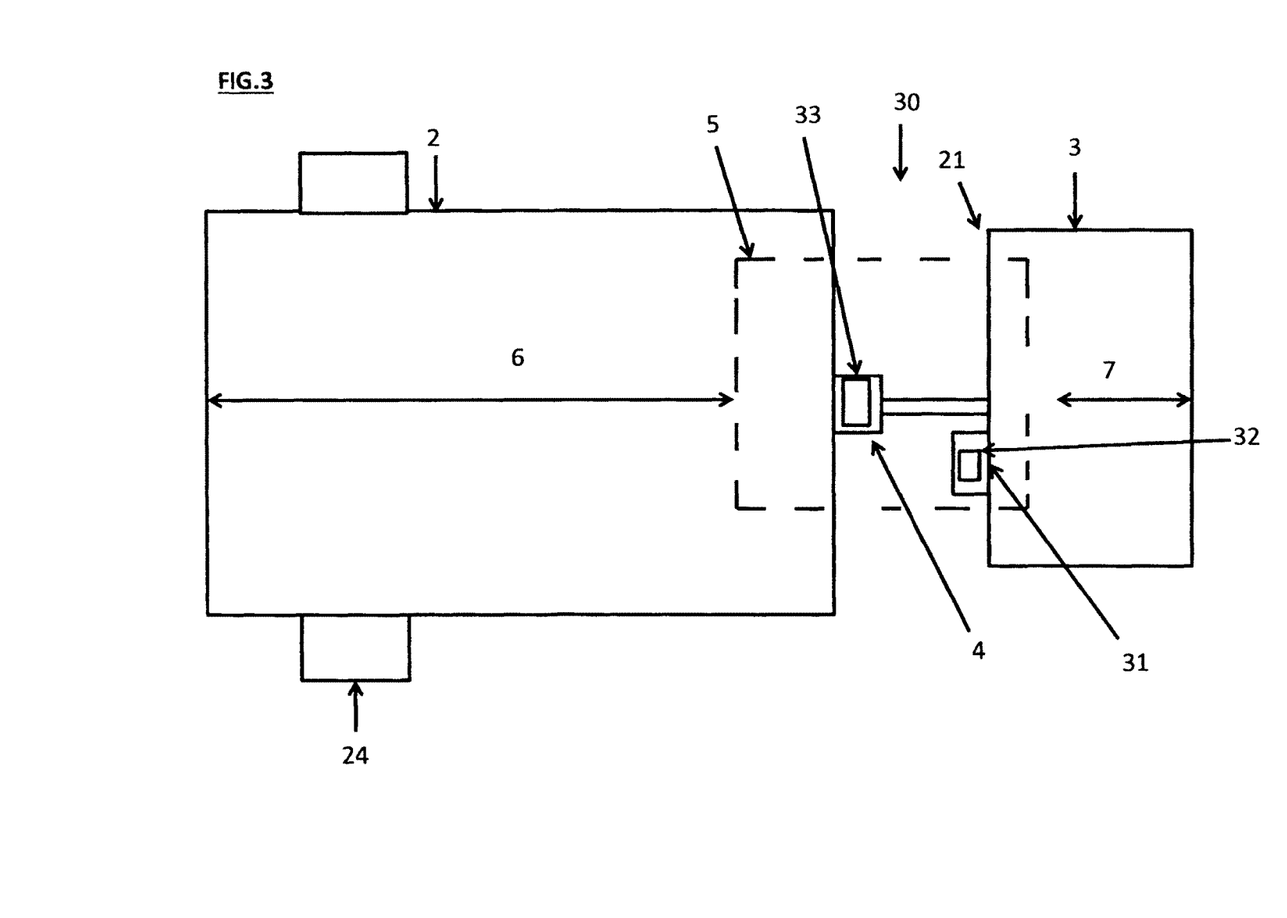
FIG. 3 shows a schematic block diagram of a system for warning of an imminent collision between the towing vehicle and the trailer when reversing a towing vehicle with a trailer according to a third embodiment of the invention.

FIG. 3 shows a schematic block diagram of a system 30 for warning of an imminent collision between the towing vehicle 2 and the trailer 3 when reversing a towing vehicle 2 with a trailer 3 according to a third embodiment of the invention. Components and structural parts with the same construction or function as in FIG. 1 or FIG. 2 have here been assigned the same reference numerals, and are not explained separately.

According to the embodiment in FIG. 3, the monitoring facility 5 here comprises a signal lamp 31 arranged on the front side 21 of the trailer 3 facing the towing vehicle 2. Here, the signal lamp 31 is arranged in such a manner on the trailer 3 that when there is the threat of a collision between the towing vehicle 2 and the trailer 3, warning light signals emitted from the signal lamp 31 hit an exterior mirror 24 of the towing vehicle 2 and can be perceived in said mirror.

According to the embodiment in FIG. 3, the signal lamp 31 can here feature an illuminant that is designed to emit light in different colors under different angle areas, so that the light emitted from the illuminant 32 has light areas of different colors, wherein the signal lamp 31 is arranged in such a manner on the trailer that if there is no threat of a collision between the towing vehicle and the trailer, then light from a first light area, for example a green light area, and on the other hand, if there is the threat of a collision between the towing vehicle and the trailer, then light from a second light area, such as a red light area, hits the exterior mirror and can be perceived in said mirror. Further, the signal lamp can also be designed to emit light in a certain angle range, wherein the signal lamp is attached to the trailer in such a manner that light emitted by the signal lamp hits an exterior mirror of the towing vehicle and can be perceived in said mirror as soon as there is the threat of a collision between the towing vehicle and the trailer. According to the embodiment shown in FIG. 3, the switching on or supply of the signal lamp 31 with electric energy can be controlled via a reversing lamp 33 on a trailer plug socket. This has the advantage that the signal lamp 31 is only switched on or supplied with electrical energy when the towing vehicle 2 also really does reverse drive, so that the driver and/or other traffic participants are not impaired in normal driving mode by light emitted from the signal lamp 31.

Figure 4:
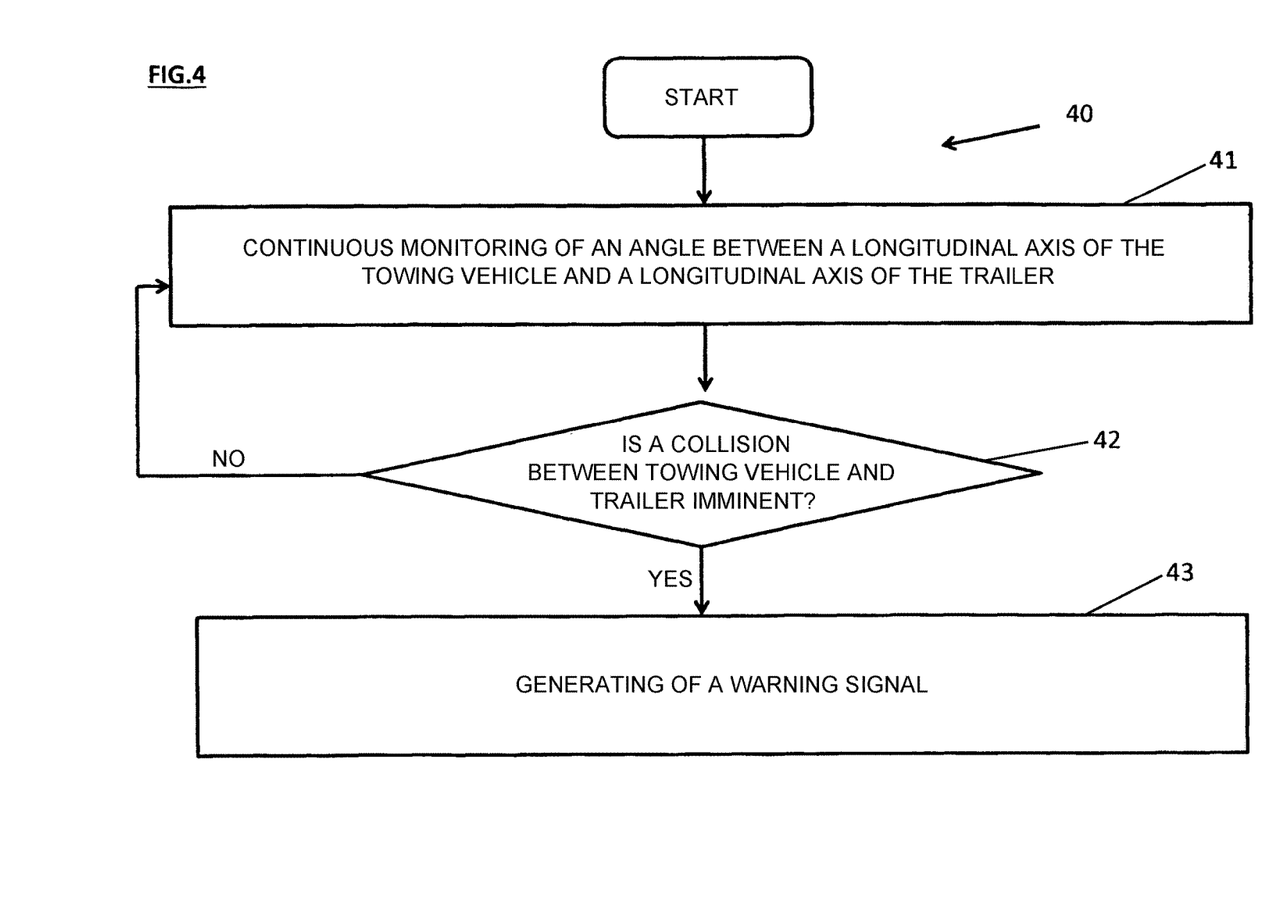
FIG. 4 shows a flow chart of a method for warning against an imminent collision between a towing vehicle and trailer when reversing a towing vehicle with a trailer according to embodiments of the invention.

FIG. 4 shows a flow chart of a method 40 for warning of an imminent collision between the towing vehicle and the trailer when reversing a towing vehicle with a trailer according to embodiments of the invention.

As is shown in FIG. 4, the method 40 here features the following steps: thus, when reversing the towing vehicle, in one step 41, an angle is continuously monitored between a longitudinal axis of the towing vehicle and a longitudinal axis of the trailer. During monitoring, in one step 42, it is detected whether there is the threat of a collision between the towing vehicle and the trailer. If it is here detected that there is the threat of a collision between the towing vehicle and trailer, in one step 43, a warning signal is further generated.

As is shown in FIG. 4, here, the step 41 is repeatedly implemented if it is detected in step 42 that there is no threat of a collision between the towing vehicle and the trailer. If, however, it is detected in step 42 that there is the threat of a collision between the towing vehicle and the trailer, the method progresses with step 43.

LIST OF REFERENCE NUMERALS

1 System
2 Towing vehicle
3 Trailer
4 Trailer coupling
5 Monitoring facility
6 Longitudinal axis, towing vehicle
7 Longitudinal axis, trailer
8 Environment sensors
9 Evaluation unit
10 Comparator
11 Warning signal emitter
12 Rear
13 Optical warning signal emitter
14 Acoustic warning signal emitter
20 System
21 Front side
22 Reflectors
23 Signal source
24 Exterior mirror
25 Reversing lamp
30 System
31 Signal lamp
32 Illuminant
33 Reversing lamp
40 Method
41 Method step
42 Method step
43 Method step

The invention claimed is:

1. A system for warning of a threat of collision between a towing vehicle and a trailer when reversing the towing vehicle with the trailer, comprising a monitoring facility for continuously monitoring an angle between a longitudinal axis of the towing vehicle and a longitudinal axis of the trailer when reversing the towing vehicle, in order to detect whether there is the threat of collision between the towing vehicle and the trailer, and to generate a warning signal when there is the threat of collision between the towing vehicle and the trailer;

wherein:
the monitoring facility features at least two reflectors arranged on a front side of the trailer facing the towing vehicle, wherein the at least two reflectors are arranged on the trailer such that when there is the threat of collision between the towing vehicle and the trailer, the reflectors reflect light emitted from at least one signal source of the towing vehicle into at least one interior and/or exterior mirror of the towing vehicle as the warning signal; or the monitoring facility features a signal lamp arranged on the front side of the trailer facing the towing vehicle, wherein the signal lamp is arranged on the trailer such that warning light signals emitted from the signal lamp hit an exterior mirror of the towing vehicle as the warning signal when there is the threat of collision between the towing vehicle and the trailer.

2. The system according to claim 1, wherein the monitoring facility features the at least two reflectors arranged on the front side of the trailer.

3. The system according to claim 2, wherein the at least one signal source of the towing vehicle is a reversing lamp of the towing vehicle.

4. The system according to claim 1, wherein the monitoring facility features the signal lamp arranged on the front side of the trailer.

5. A method of warning of a threat of collision between a towing vehicle and a trailer when reversing the towing vehicle with the trailer, wherein the method comprises the following steps:
   a) continuously monitoring an angle between a longitudinal axis of the towing vehicle and a longitudinal axis of the trailer when reversing the towing vehicle;
   b) detecting whether there is the threat of collision between the towing vehicle and the trailer; and
   c) generating a warning signal if there is the threat of collision between the towing vehicle and the trailer; wherein:
      the steps a), b) and c) comprise emitting light signals from at least one signal source of the towing vehicle when reversing the towing vehicle, providing at least two reflectors on a front side of the trailer facing the towing vehicle, wherein the reflectors are arranged on the trailer such that when there is the threat of collision between the towing vehicle and the trailer the reflectors reflect the light signals emitted from the at least one signal source of the towing vehicle into at least one interior and/or exterior mirror of the towing vehicle as the warning signal, and determining whether the emitted light signals are reflected in the at least one interior and/or exterior mirror of the towing vehicle in order to detect whether there is the threat of collision between the towing vehicle and the trailer; or
      the steps a), b) and c) comprise providing a signal lamp on the front side of the trailer facing the towing vehicle, wherein the signal lamp is arranged on the trailer such that when there is the threat of collision between the towing vehicle and the trailer warning light signals emitted by the signal lamp hit at least one exterior mirror of the towing vehicle as the warning signal, emitting the warning light signals from the signal lamp when reversing, and determining whether the emitted warning light signals hit the at least one exterior mirror of the towing vehicle in order to detect whether there is the threat of collision between the towing vehicle and the trailer.

6. The method according to claim 5, wherein the steps a), b) and c) comprise the emitting of the light signals from the at least one signal source of the towing vehicle, the providing of the at least two reflectors on the front side of the trailer, and the determining of whether the emitted light signals are reflected in the at least one interior and/or exterior mirror of the towing vehicle in order to detect whether there is the threat of collision between the towing vehicle and the trailer.

7. The method according to claim 5, wherein the steps a), b) and c) comprise the providing of the signal lamp on the front side of the trailer, the emitting of the warning light signals from the signal lamp, and the determining of whether the emitted warning light signals hit the at least one exterior mirror of the towing vehicle in order to detect whether there is the threat of collision between the towing vehicle and the trailer.

8. A system for warning a driver of a vehicle about a threat of collision between the vehicle and a trailer being towed by the vehicle,
   wherein the vehicle has an interior and/or exterior mirror and a light source mounted on the vehicle,
   wherein the light source is adapted to emit light, and
   wherein the system comprises a reflector arranged on the trailer such that the reflector reflects the light from the light source onto the mirror so that the light further reflects from the mirror toward the driver to be perceptible by the driver as a warning of the threat of collision, only when the trailer is in an angular position relative to the vehicle that causes the threat of collision.

9. The system according to claim 8, wherein the reflector is arranged on a front side of the trailer.

10. The system according to claim 8, wherein the light source is a reversing lamp of the vehicle.

11. A method of operating the system according to claim 8, comprising the following steps when the trailer is in the angular position that causes the threat of collision:
    emitting the light from the light source,
    with the reflector, reflecting the light from the light source onto the mirror, and
    with the mirror, reflecting the light toward the driver to be perceptible by the driver as the warning.

12. The method according to claim 11, wherein the emitting of the light is performed only when the vehicle is reversing.

13. A system for warning a driver of a vehicle about a threat of collision between the vehicle and a trailer towed by the vehicle,
    wherein the vehicle has a mirror mounted on the vehicle, and
    wherein the system comprises a signal lamp that is adapted to emit a warning light signal, and that is arranged on the trailer such that the warning light signal emitted by the signal lamp impinges on the mirror so that the warning light signal reflects from the mirror toward the driver to be perceptible by the driver as a warning of the threat of collision, only when the trailer is in an angular position relative to the vehicle that causes the threat of collision.

14. The system according to claim 13, wherein the warning light signal comprises light of a first color, the signal lamp is adapted to emit the warning light signal in a first angular range around the signal lamp, the signal lamp is adapted to emit light of a second color different from the first color in a second angular range different from the first angular range around the signal lamp, and the signal lamp is arranged on the trailer such that the light of the second color impinges on the mirror and reflects from the mirror toward the driver when the trailer is in a second angular position relative to the vehicle that does not cause the threat of collision.

15. The system according to claim 13, wherein the signal lamp is connected to the switched electrical supply of a reversing lamp of the vehicle.

16. The system according to claim 13, wherein the signal lamp is arranged on a front side of the trailer.

17. A method of operating the system according to claim 13, comprising the following steps when the trailer is in the angular position that causes the threat of collision:
    emitting the warning light signal from the signal lamp onto the mirror, and
    with the mirror, reflecting the warning light signal toward the driver to be perceptible by the driver as the warning.

18. The method according to claim 17, wherein the emitting of the warning light signal is performed only when the vehicle is reversing.

* * * * *